United States Patent
Lo

(10) Patent No.: US 7,962,737 B2
(45) Date of Patent: Jun. 14, 2011

(54) METHODS, MEDIA AND APPARATUS FOR BOOTING DISKLESS SYSTEMS

(75) Inventor: Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 802 days.

(21) Appl. No.: 11/944,018

(22) Filed: Nov. 21, 2007

(65) Prior Publication Data

US 2009/0132797 A1   May 21, 2009

(51) Int. Cl.
*G06F 9/24* (2006.01)
*H04L 9/32* (2006.01)

(52) U.S. Cl. ............... 713/2; 713/1; 713/100; 713/175; 713/176

(58) Field of Classification Search ................ 713/1, 2, 713/100, 175, 176
See application file for complete search history.

(56) References Cited

U.S. PATENT DOCUMENTS

| | | | |
|---|---|---|---|
| 5,349,643 A * | 9/1994 | Cox et al. ....................... 713/155 |
| 5,802,297 A | 9/1998 | Engquist |
| 6,101,601 A | 8/2000 | Matthews et al. |
| 6,230,267 B1 * | 5/2001 | Richards et al. ............. 713/172 |
| 6,266,809 B1 | 7/2001 | Craig et al. |
| 6,463,535 B1 | 10/2002 | Drews |
| 6,539,480 B1 | 3/2003 | Drews |
| 6,892,297 B1 | 5/2005 | Agullar et al. |
| 7,036,040 B2 | 4/2006 | Nicholson et al. |
| 7,421,516 B2 * | 9/2008 | Minogue et al. .................. 710/8 |
| 7,512,786 B2 * | 3/2009 | England ......................... 713/156 |
| 2004/0003223 A1 | 1/2004 | Fortin et al. |
| 2004/0153647 A1 * | 8/2004 | Rotholtz et al. ............. 713/176 |
| 2005/0005096 A1 * | 1/2005 | Miller ........................... 713/155 |
| 2006/0059338 A1 * | 3/2006 | Feinleib et al. ............... 713/165 |
| 2006/0136727 A1 * | 6/2006 | Voss et al. ..................... 713/175 |
| 2006/0143432 A1 | 6/2006 | Rothman et al. |
| 2007/0006021 A1 | 1/2007 | Nicholson et al. |
| 2008/0082809 A1 * | 4/2008 | Rothman et al. .................. 713/1 |

* cited by examiner

*Primary Examiner* — Vincent T Tran
(74) *Attorney, Agent, or Firm* — Garrana Tran LLP; Andrea E. Tran

(57) ABSTRACT

The disclosure provides a system, method, and computer readable medium for booting a diskless client in an information handling system (IHS). Cached boot data is stored in a non-volatile memory of the diskless client. The diskless client sends a boot request with an identifier and receives a boot reply containing an image signature associated with the identifier. The diskless client determines whether there is a match between a cached image signature and the received image signature. If there is a match, the diskless client boots with the cached boot data. If there is not a match, the cached boot data is invalidated and new boot data is requested and received from a server. The diskless client stores the new boot data in the non-volatile memory and boots with the new boot data. The cached boot data may be update when network traffic is below a predetermined level and/or an administrator change to boot data affects a plurality of diskless clients. The diskless client request and receives updated boot data stores the updated boot data in the non-volatile memory.

18 Claims, 7 Drawing Sheets

| Boot Image | img 1 | img 1 | ... | img 2 | img 2 | ... | img N |
|---|---|---|---|---|---|---|---|
| User ID | User 0001 | User 0002 | ... | User 0010 | User 0011 | ... | User 000N |

FIG. 7B

| Boot Image | img 1 | img 1 | ... | img 2 | img 2 | ... | img N |
|---|---|---|---|---|---|---|---|
| Device Identifier | ID 0001 | ID 0002 | ... | ID 0010 | ID 0011 | ... | ID 000N |

FIG. 7A

METHODS, MEDIA AND APPARATUS FOR BOOTING DISKLESS SYSTEMS

BACKGROUND

1. Technical Field

The present disclosure relates generally to the field of information handling systems. More specifically, but without limitation, the present disclosure relates to booting diskless clients within information handling systems.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an IHS is a diskless system which may allow companies to reduce storage cost, maintenance cost, and potentially solve the majority of manageability issues associated with traditional personal computers (PCs). A diskless system may have a server, a network, and one or more diskless clients or diskless computers. Furthermore, each diskless client or diskless computer operates without an attached hard drive for storage. In place of a local hard drive, each diskless client may use a network drive for storage or the like. For example, one or more diskless clients may retrieve boot data, programs and/or applications stored on a network drive. Such a network drive may often be referred to as a virtual disk. A diskless client is sometimes referred to as a diskless computer or PC, a network computer, a thin client, diskless node, or a hybrid client.

A boot storm or network storm may occur when several diskless computers in the system attempt to boot from a network drive, thereby creating high network traffic. The high network demand causes network congestion and may cause a server to be overloaded. For example, a boot storm can occur during the morning shift when employees are arriving at the same time and booting up their respective diskless computers. Also, a boot storm may occur after a power outage when a large number of systems are attempting to re-boot. An employee's inability to boot a diskless computer during a boot storm may result in significant down time and loss in productivity.

Providing multicast boot streaming to diskless clients may prevent or reduce the occurrence of boot storms. In essence, any boot data would be multicasted through the network to diskless clients. By multicasting the data, network bandwidth demands during a boot storm may be reduced.

Boot images may also be cached at network devices as a means to prevent or reduce the occurrence of boot storms. When a boot storm occurs, the diskless computers would download from the network devices rather than from a server. Both methods previously mentioned may reduce network demand and reduce the potential risk of a boot storm. However, the proposed methods may still utilize significant network bandwidth to transmit boot data, thereby leaving open the possibility of an occurrence of a boot storm.

Thus a need remains for an improved diskless system that further reduces or eliminates network access during booting, and reduces network access during normal operation. Further, the improved diskless system may maintain and update cached boot images in the diskless computers when network congestion is low to reduce the potential for future boot storms. Additionally, the boot image cached by each diskless computer may be verified as an up-to-date boot image before it is used to boot the diskless computer.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides method of booting a diskless client in an information handling system (IHS) by storing a first boot data comprising a first image signature and a first boot image in a non-volatile memory of the diskless client, sending a boot request from the diskless client, wherein the boot request comprises an identifier, receiving a boot reply containing a second image signature associated with the identifier, wherein the boot reply is received after validation of the boot request, determining whether there is a match between the first image signature and the second image signature and responding to the match by booting the diskless client utilizing the first boot data.

Another aspect of the disclosure provides a method of providing boot data in an IHS by storing a second boot data comprising a second image signature and a second boot image, receiving a boot request at a server, wherein the boot request comprises a identifier, validating the boot request by determining if the identifier provides authority to access the second boot data, and sending a boot reply comprising the second image signature from the server after validation the boot request.

Yet another illustrative aspect provides a diskless booting system in an IHS comprising a non-volatile memory, wherein the non-volatile memory stores a first boot data comprising a first image signature and a first boot image, and a diskless client coupled to the non-volatile memory, wherein the diskless client sends a boot request comprising an identifier. A boot reply containing a second image signature, wherein the boot reply is received by the diskless client after validation of the boot request. A processor located in the diskless client determining whether there is a match between the first image signature and the second image signature, wherein the diskless client responds to the match by utilizing the first boot data to boot.

Another illustrative aspect provides a diskless booting system in an IHS comprising a server storing a second boot data comprising a second image signature and a second boot image. A boot request comprising an identifier, wherein the server receives the boot request and validates the boot request by determining if the identifier provides authority to access the second boot data. A boot reply comprising the second image signature, wherein the server further sends the boot reply after validation of the boot request.

Yet another illustrative aspect provides a computer-readable medium having computer executable instructions for performing a method comprising storing a first boot data comprising a first image signature and a second boot image in a server, storing a second boot data comprising a second image signature and a second boot image in a non-volatile memory of a diskless client, sending a boot request from the diskless client, wherein the boot request comprises an identifier, sending the boot reply comprising the first image signature from the server to the diskless client after validation of the boot request determining whether there is a match between the first image signature and a second image signature, and responding to the match by booting the diskless client utilizing the second boot data comprising the second image signature and the second boot image.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein:

FIG. 7A illustrates a device boot image mapping table;

FIG. 7B illustrates a user boot image mapping table; and

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
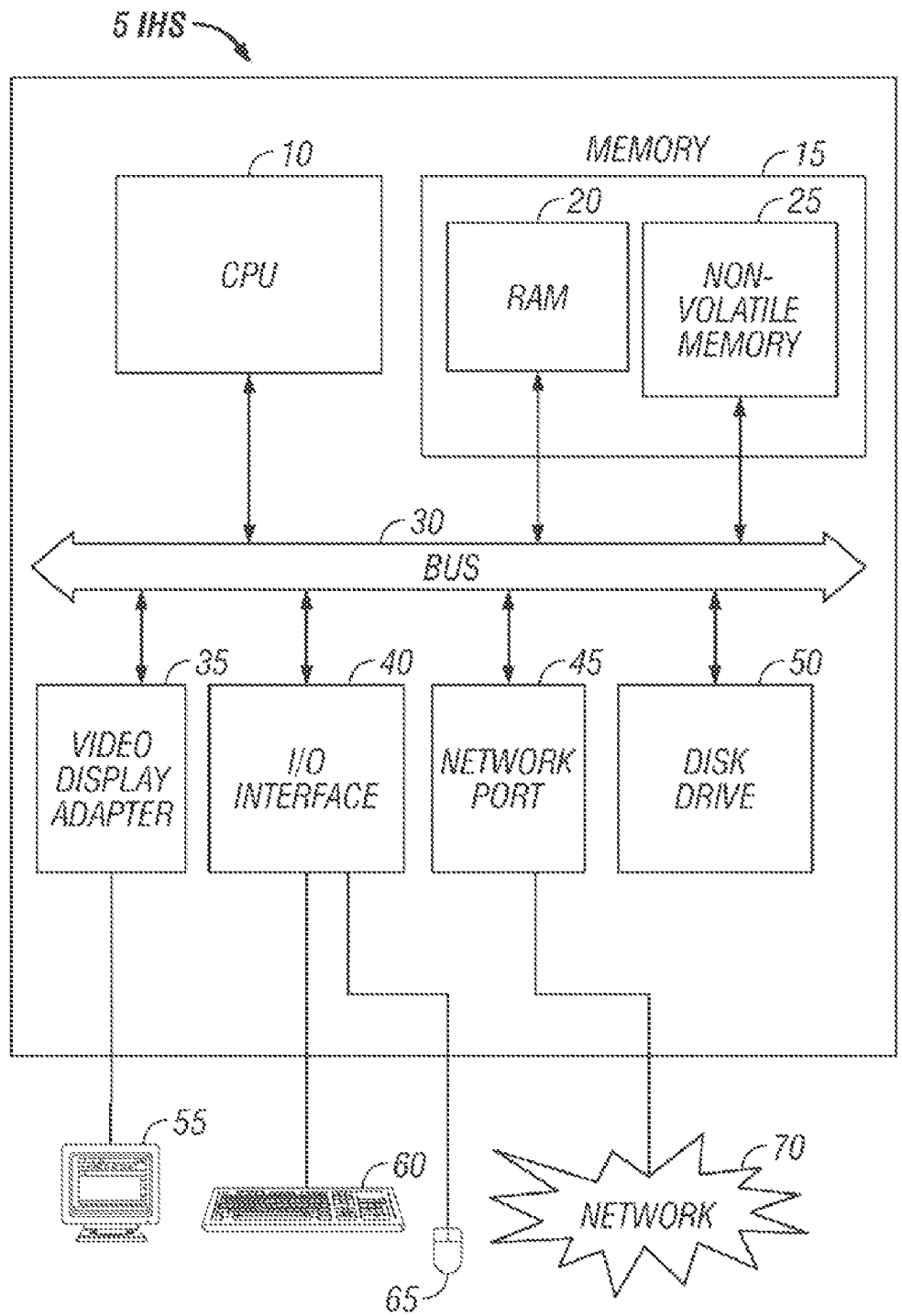
FIG. 1 illustrates one possible implementation of an information handling system (IHS) according to the present disclosure.

FIG. 1 illustrates one possible implementation of an IHS 5 comprising a CPU 10. It should be understood that the present disclosure has applicability to information handling systems as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. The CPU 10 may be in data communication over a local interface bus 30 with components including memory 15 and input/output interfaces 40. The memory 15, as illustrated, may include non-volatile memory 25. The non-volatile memory 25 may include, but is not limited to, firmware flash memory and electrically erasable programmable read-only memory (EEPROM). The firmware program (not shown) may contain, programming and/or executable instructions required to control a keyboard 60, mouse 65: video display 55 and/or other input/output devices not shown here. The memory may also comprise RAM 20. The operating system and application programs may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Although the invention has been described with reference to specific implementations, it will be understood by those skilled in the art that various changes may be made without departing from the spirit or scope of the invention. Various examples of such changes have been given in the forgoing description. Accordingly, the disclosure of particular implementations is intended to be illustrative of the scope of the invention and is not intended to be limiting. It is intended that the scope of the invention shall be limited only to the extent required by the appended claims. For example, to one of ordinary skill in the art, it will be readily apparent that the information handling system discussed herein may be implemented in a variety of implementations, and that the forgoing discussion of certain of these implementations does not necessarily represent a complete description of all possible implementations.

For simplicity and clarity of illustration, the drawing and/or figures illustrate the general manner of construction, and descriptions and details of well known features and techniques may be omitted to avoid unnecessarily obscuring the disclosure. For example a network may comprise modems switches, routers, etc. However, a network comprising the previously listed components may be referred to herein simply as a network without discussion of the aforementioned components.

Figure 2:
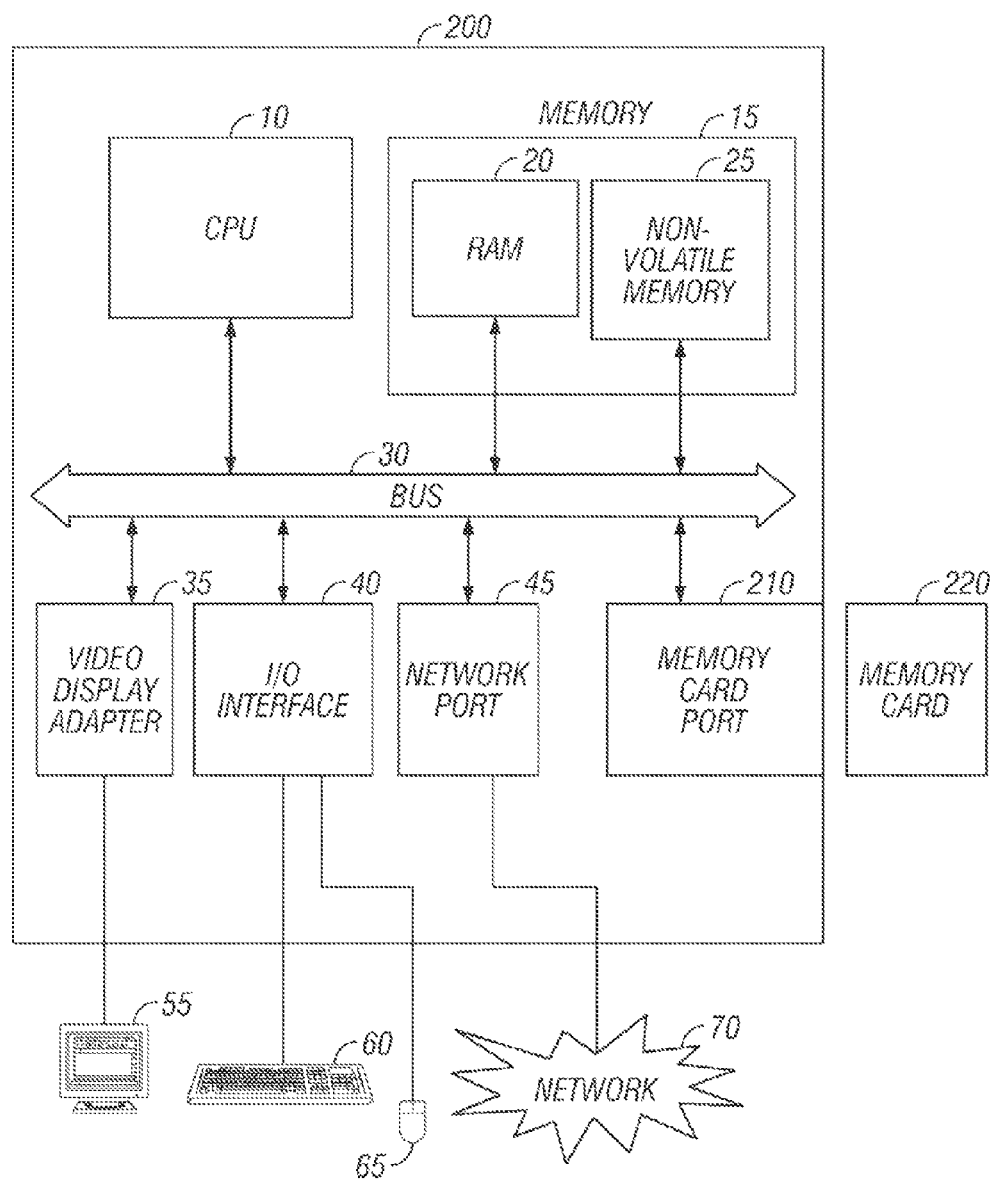
FIG. 2 provides a schematic of a possible implementation of a diskless IHS.

FIG. 2 shows a schematic of a possible implementation of a diskless IHS. In the following example, a diskless IHS is shown as a diskless client. However, it is known to one of ordinary skill in the art that a diskless IHS may take many other forms. A diskless IHS or diskless client 200 may have a processor 10, memory 15, random access memory (RAM) 20, non-volatile memory 25, a bus 30, a video display adapter 35, a display 55, an input/output interface 40, a keyboard 60, a mouse 65, a network port 45, network 70, and/or other components. It is known to one of ordinary skill in the art that a diskless client may have some combination of the above listed components, it may omit some of the components listed, or it may add other components known to one of ordinary skill.

A hybrid computer or client may exhibit traits of both a diskless PC and a traditional PC. A hybrid computer may have a local hard drive used for storage, but the hybrid computer may run some applications remotely. For example, a hybrid computer may use a network drive to boot up, but it may store a uses's files in the local hard drive or on a removable storage device. Diskless PC and hybrid computers both enjoy the same flexibility regarding hardware and software that a traditional PC enjoys. While the present disclosure discusses methods, processes, systems, and/or apparatus involving diskless clients or diskless PCs, it is clear to one of ordinary skill in the art that the methods, processes, systems, and/or apparatus discussed are equally applicable to hybrid clients, hybrid computers, or any other systems using a network drive to boot up.

In a diskless system, a boot storm or network storm may arise when several diskless PCs in a system are attempting to boot from a boot server at the same time. A boot storm creates high network traffic which may cause a boot server to overload, thereby preventing users or devices from booting quickly. In order to reduce or prevent a potential boot storm, diskless PCs may cache a boot image locally.

In one implementation of a diskless system, a diskless PC as shown in FIG. 2 may also have a memory port 210 and an external memory card 220. A boot image or a portion of a boot image may be cached on a removable memory, such as a memory card 220, which may be inserted into a memory card port 210 of a diskless PC 200. The memory card 220 may be a memory card, such as but not limited to a CompactFlash, SecureDigital, SmartMedia, Memory Stick, MultiMediaCard or any other suitable memory medium. Alternatively, a boot image may be cached in a non-volatile memory 25 of a diskless PC 200. The non-volatile memory 25 may be removably attached to the motherboard, permanently attached to the motherboard, or placed elsewhere in the diskless PC 200. For example, a non-volatile memory host controller interface (NVMHCI) based flash module may cache a boot image. A boot image may be stored on a non-volatile memory so that it is not lost during power failure or the like. In another implementation, the boot image may be cached on the hard drive of a hybrid computer in hybrid system. When a boot image is locally cached as discussed in the multiple implementations above, a diskless PC 200 can boot using the locally cached boot image at any time, especially when network traffic is high. This allows the diskless PC 200 to boot without significantly effecting network traffic.

Figure 3:
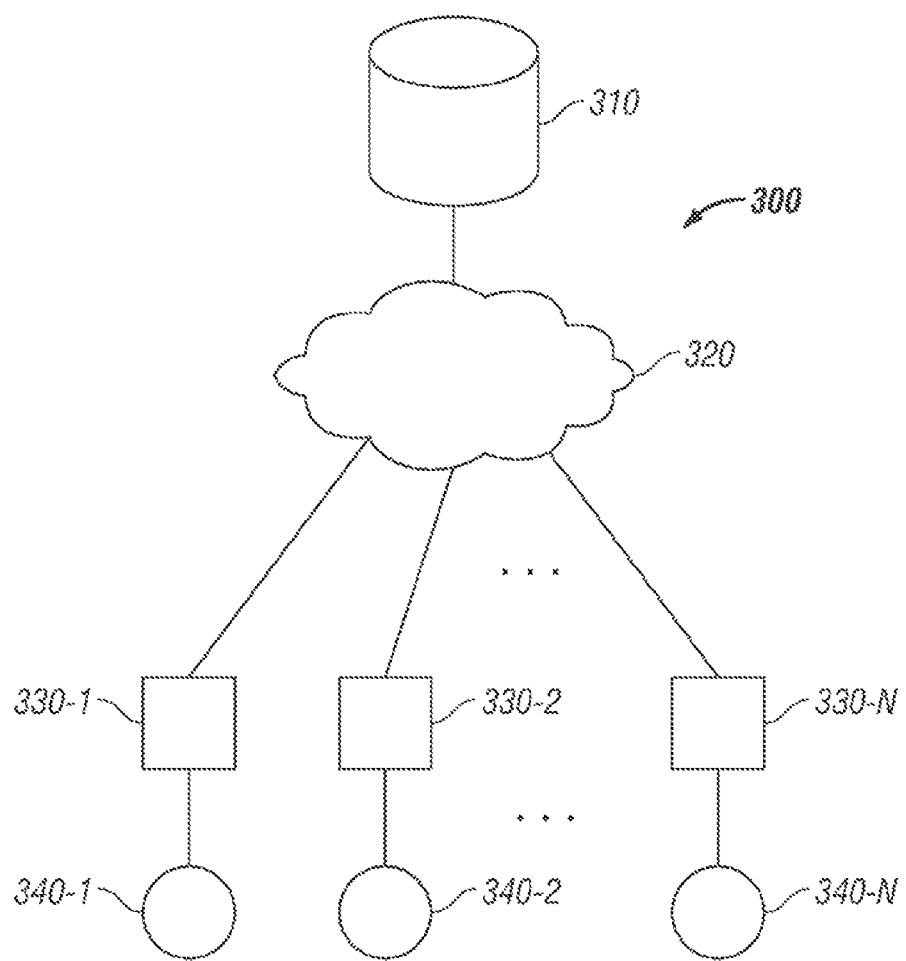
FIG. 3 provides an illustration of one possible implementation of a diskless system.

FIG. 3 illustrates an IHS, shown as one possible implementation of a diskless system. A diskless system 300 may have one or more servers 310 coupled to several diskless clients 330-1, 330-2 . . . 330-N through a network 320. In the implementation shown, the diskless clients are diskless personal computers (PCs) that may be operated by an individual user 340-1, 340-2 . . . 340-N. However, in other implementations of a diskless system, a diskless client may not require a user. In a traditional PC, a local hard drive may be used for storage to run an operating system and other applications. In a diskless system, a diskless client or diskless PC 330-1 . . . 330-N is booted from a server 310 through the network 320. Depending on the type of diskless system, the operating system and applications may run locally or they may run at the server.

In the implementations discussed throughout the present disclosure, the use of a diskless client is interchangeable with the use of a diskless PC and vice versa. The use of either term does not limit the disclosure to a specific implementation using only a diskless client or a diskless PC. Another implementation of a diskless system may be a hybrid system in which one or more hybrid clients replace some or all of the diskless clients or diskless PCs in a diskless system.

Figure 4:
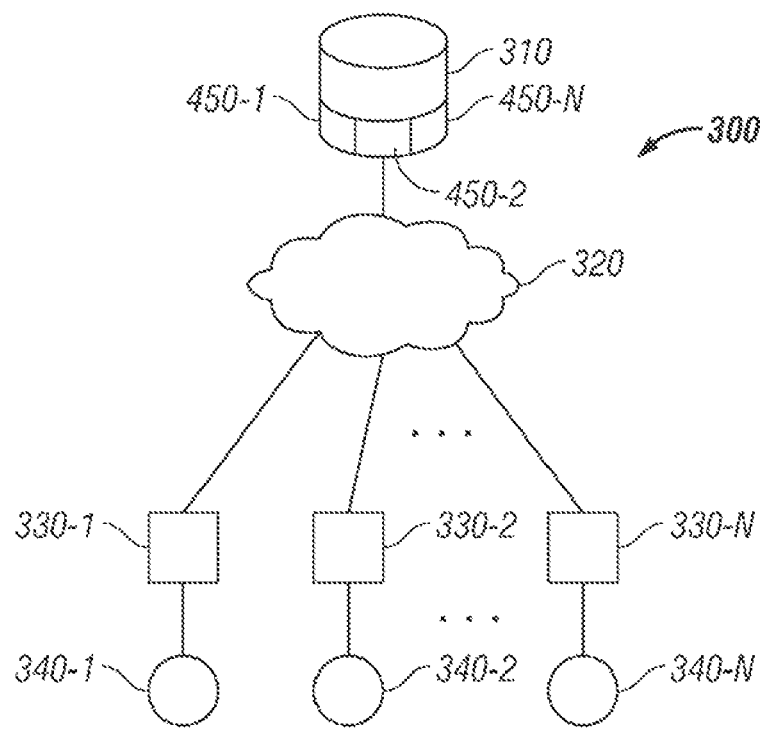
FIG. 4 illustrates an example of a dedicated image system.

Diskless systems may also be classified into dedicated image systems or shared image systems. In a dedicated image system, as shown in FIG. 4, each user 340-1, 340-2, . . . 340-N or diskless client 330-1, 330-2, . . . 330-N may have unique boot data 450-1, 450-2, . . . 450-N stored in the boot server 310. Each component of boot data 450-1 . . . 450-N may contain an image signature and a boot image specific to a user or client. Each image signature may operate as a tag identifying the different boot images, and the boot image contains operating system data required during the booting process of an operating system. A diskless client, shown as a diskless PC 330-1 . . . 330-N, or a user 340-1 . . . 340-N in a dedicated image system may be able to alter his/her unique boot data stored on the boot server 310. This allows the users 340-1 . . . 340-N or the diskless clients 330-1 . . . 330-N to have a unique setup that may be maintained in the diskless system.

Figure 5:
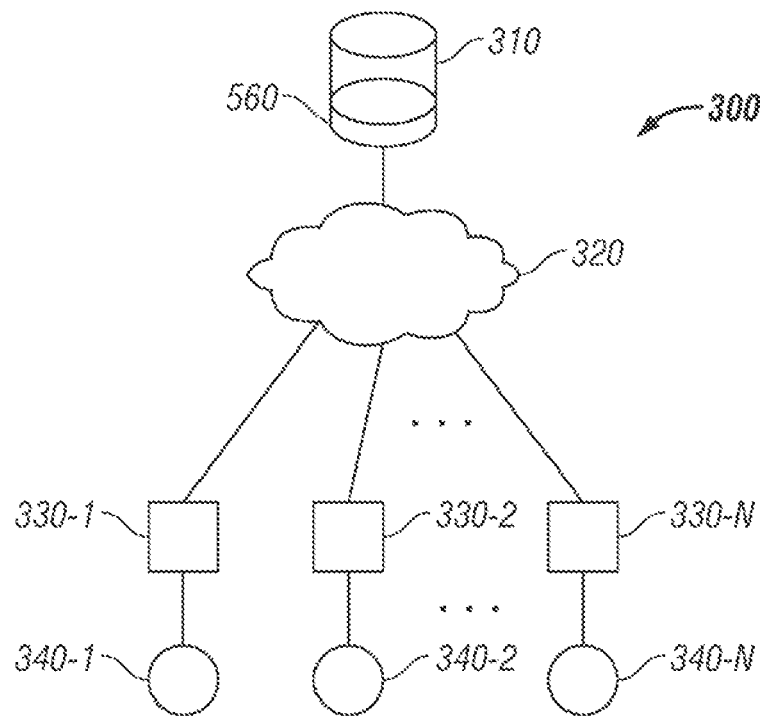
FIG. 5 illustrates an example of a shared image system.

In a shared image system, as shown in FIG. 5, multiple diskless clients 330-1 . . . 330-N or users 240-1 . . . 340-N may have a shared boot image 560 stored in the boot server 310. One or more diskless clients 330-1 . . . 330-N or users 340-1 . . . 340-N may boot using a shared boot image 560. For instance, all users from a particular department of a company may share the same boot image. While only one shared boot image is shown, the boot server 310 may store additional shared boot images for other departments or the like. Further, the shared boot image 560 may not be altered by the individual users 340-1 . . . 340-N. Only an authorized administrator or the like can modify the shared boot images.

Boot images may change dynamically in a diskless system, rendering a cached boot image useless. One example of such a change is when an administrator updates a boot image with an operating system patch. In order to accommodate changes in a boot image, a cached boot image can be validated before it is utilized to boot a diskless PC. Further, a boot image may be pre-populated into the caches of diskless PCs in the system to prevent changes in a diskless system from causing a boot storm in the future.

Figure 6:
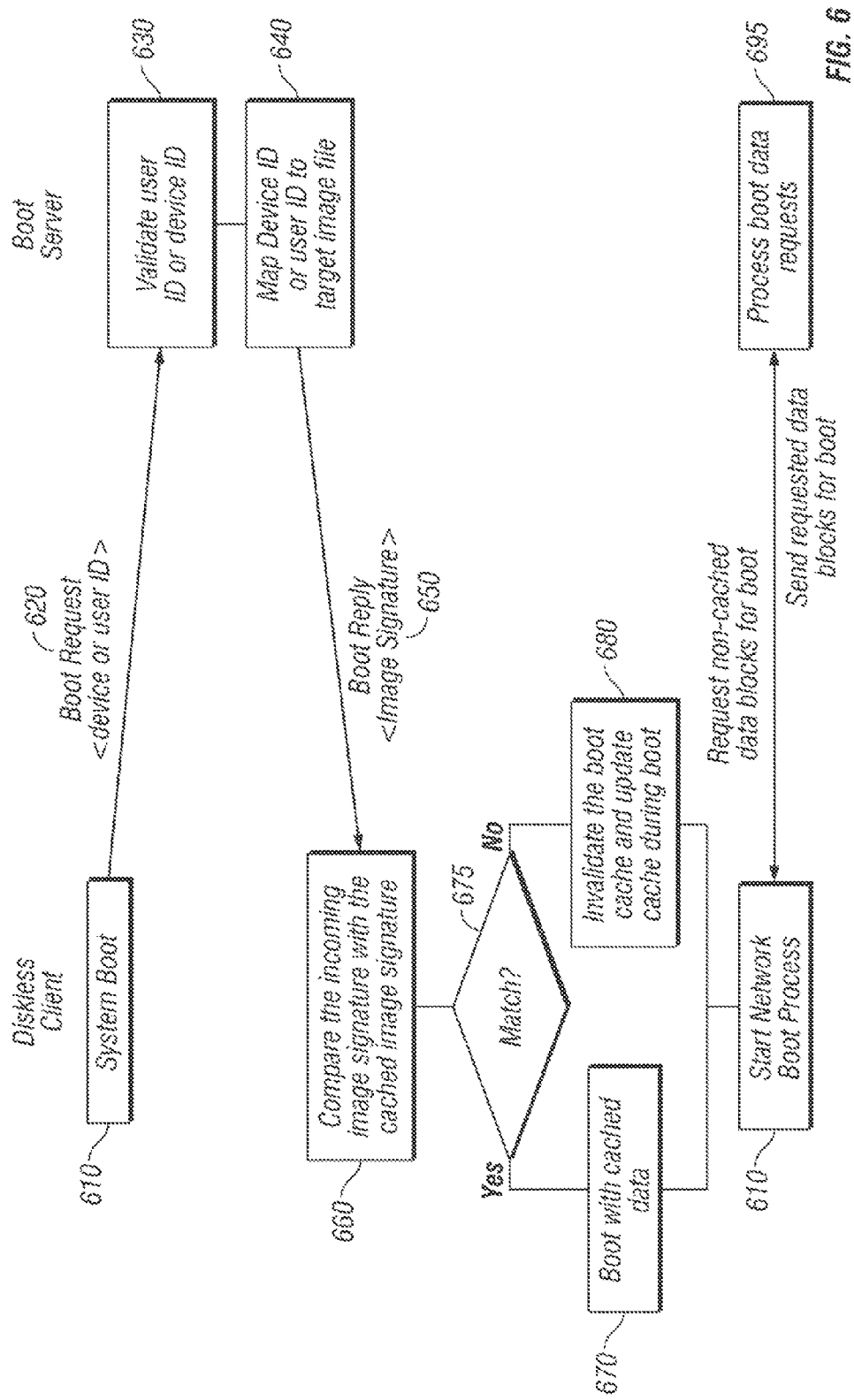
FIG. 6 provides a flow chart illustrating a boot cache validation procedure.

An implementation of a method for boot cache validation is illustrated in FIG. 6. Various methods are contemplated including all or less than all of the steps described herein and/or mentioned below, any number of repeats or any of the steps shown and/or mentioned below, and in any order. A diskless client begins booting in step 610 in the diskless system by sending a boot request containing a user or device identifier to a boot server in step 620. The user or device identifier may be unique to the user or device and make take the form of a user name/number, a Media Access Control (MAC) address or the like. A user or device identifier may be used to locate an associated boot image using a mapping table.

In one implementation, device identifiers are mapped to boot data files in an device boot image mapping table, as shown in FIG. 7A. The boot data files may contain a boot image signature and a boot image, as well as other additional data. Each device in the system may have a unique device identifier, and the mapping table indicates which boot data may be used to boot a device. For example, the devices ID0001 and ID0002 may be mapped to img1, devices ID0010 and ID0011 may be mapped to img2, and so on. The mapping table identifies which boot data a specific device should use to boot up in a diskless system. In this implementation, booting is client device specific. Regardless of which user is operating a diskless client, a device will use the same boot data. In the event a different user operates the device, the device will still use a specified boot data associated with that particular device to boot.

In another implementation, a user identifier is mapped to boot data files in an user boot image mapping table, as shown in FIG. 7B. The mapping table identifies which boot data is associated with which users. For example, user0001 and user0002 may be mapped to img1 user0010 and user0011 may be mapped to img2, and so on. In this implementation, booting is user specific. Regardless of which diskless client a user is operating in the system, a device will boot using a specific boot data corresponding to the user. For example, if a user0001 moves from a first device that has img1 cached to a second device that has img2 cached, the second device will use the image associated with the user (i.e., img1) to boot. Since the second device does not have img1 cached, the second device must request img1 from the boot server.

Returning to FIG. 6, when the boot server receives the boot request, the device identifier or user identifier is validated in step 630 according to the type of mapping table being used by the system. If the system uses a user boot image mapping table, as showing in FIG. 7B, then user credentials are verified. If the system uses a device boot image mapping table, as shown in FIG. 7A, then client credentials or device credentials are verified. Since each device identifier or user identifier corresponds to an associated boot data, the boot server maps the device identifier or user identifier to an associated boot data in step 640 and retrieves an image signature for the associated boot image. The boot server then sends a boot reply containing the image signature to the diskless client in step 650.

When the diskless client receives the boot reply containing the image signature, it compares the received image signature to an image signature of a boot image cached by the diskless client in step 660. The diskless client checks if the received image signature and the cached image signature match in step 675. If the image signatures match, then the diskless client may boot using the boot data cached by the diskless client in step 670. If the image signatures do not match, then the diskless client invalidates the cached boot data in step 680. Next, the diskless client begins the network boot process in step 690. When the boot data is valid or the image signatures match, the diskless client boots using the cached boot data. In the case that the cached boot data is invalid or the image signatures do not match, the diskless client request boot data from the boot server and the boot server processes the request by sending the requested boot data blocks in step 695. The boot data currently cached by the diskless client has been invalidated 680, and the boot data requested from the server will replace the cached boot data. The boot data, including a valid boot image and a corresponding image signature, sent by the boot server is stored within the memory of a diskless client. Now that the diskless client has a valid boot image stored, the diskless client may boot from its memory using the valid boot image received from the boot server.

Figure 8:
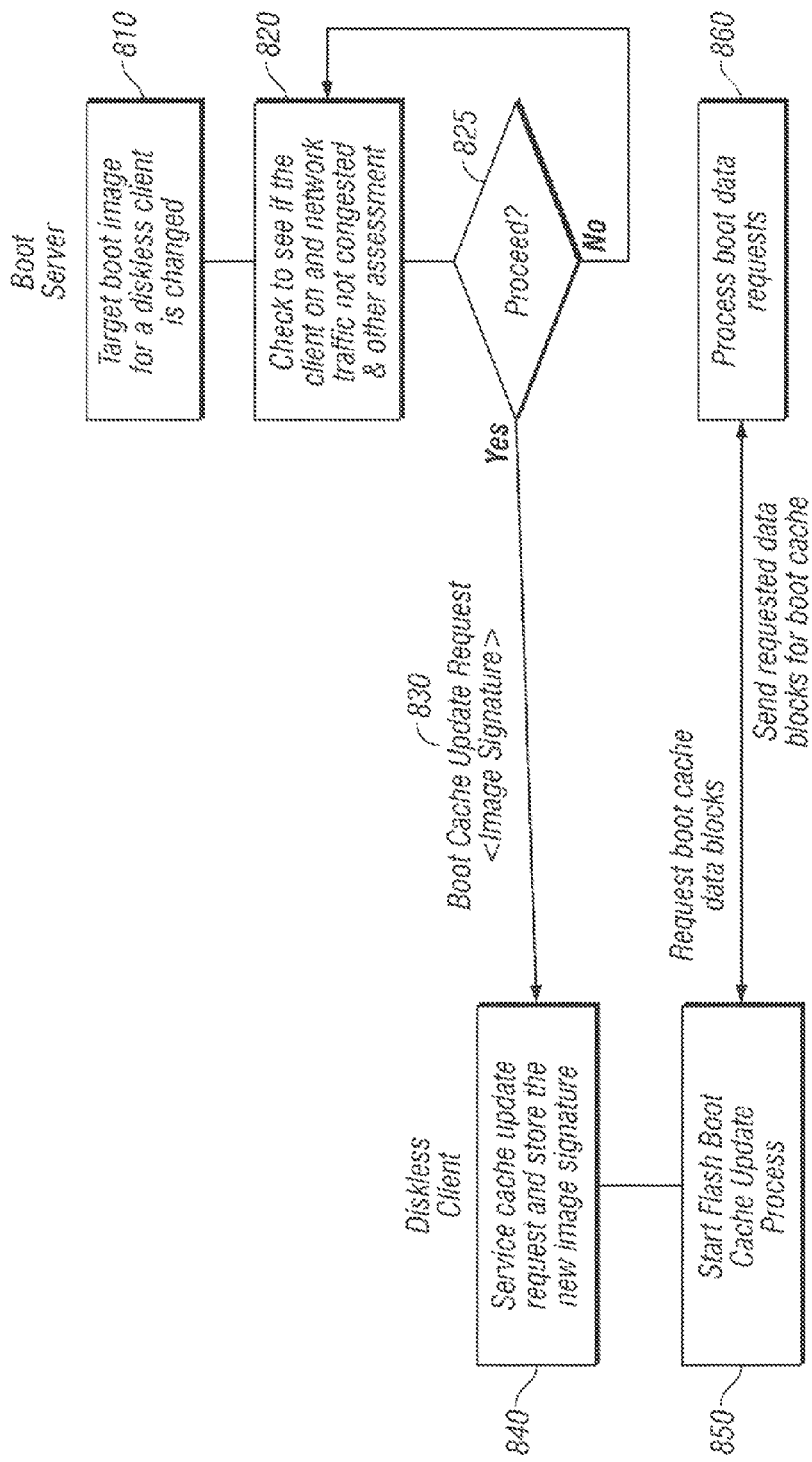
FIG. 8 provides a flow chart illustrating a boot cache pre-population method.

FIG. 8 provides a method to pre-populate a diskless client's boot cache. In some diskless systems, boot images may only be modified by an administrator or an authorized individual. Therefore, boot images remain unchanged unless an administrator or authorized individual changes them. When a boot image for a diskless client is changed in step 810, the diskless clients associated with that boot image may have an invalid boot image cached in non-volatile memory.

If the diskless system were to wait until each diskless client sent a boot request to update a boot image, every diskless client with an invalid boot image cached would need to download a valid boot image from the boot server. If every boot request from the diskless clients occurs together or close in time to one another, a boot storm may occur when several of the diskless clients are attempting to download a valid boot image from the boot server. In order to reduce the occurrence or prevent a potential boot storm, the boot server first checks whether the diskless client is powered on and connected to the network in step 820. Since the amount of network traffic that a diskless system can handle varies with the components present in the system, the administrator or the like may define a predetermined level of network traffic at which pre-population should not proceed. The boot server may determine whether there is high network traffic as characterized by a level of network traffic which exceeds the predetermined level set by the administrator. In addition to determining the level of network traffic and the status of the diskless client, the boot server may also consider other factors affecting network traffic. For example, the boot server may check to determine the number of diskless clients affected by an administrator modifying a boot image or the like.

The boot server may consider several factors including whether the diskless client is booted, whether network traffic is high and other assessments in deciding if the pre-population process should proceed to step 825. If the diskless client is not powered on or connected to the network, then step 820 is repeated. The boot server may wait until the diskless client is booted or it may cause the diskless client to power on. For example, the boot server may power on the diskless client using out-of-band management or the like. If the network traffic is high, then the check is repeated in step 820. In one implementation: a network may use a quality of measure such as Quality-of-Service (QoS) to prioritize network traffic. In a QoS network, request and other data used to pre-populate a diskless client's boot cache may be marked "low priority". If other factors negatively affecting network traffic are present, then step 820 is repeated. For example, the system may determine the number of diskless clients affected by an administrator's change to a cached boot image. If several diskless clients were affected, the potential network demands that would be caused by the diskless clients requesting to boot from the server could be high. Consequently, the boot cache of the diskless clients should be pre-populated. However, if only a few diskless clients were affected, the potential network demands would be low and cached boot images do not need to be pre-populated. Other factors affecting network traffic may be contemplated as well. The pre-population process is not limited to checking the number of diskless clients affected by a change to a cached boot image.

If the diskless client is powered on and connected to the network, network traffic is low, and other assessment requirements are met, a boot cache update request is sent to the diskless client in step 830. The boot cache update request contains an image signature corresponding to the boot image modified by the administrator. The diskless client receives the boot cache update request and stores the image signature in step 840. Next, the diskless client begins the boot cache update process by requesting new boot image data blocks from the boot server in step 850. The boot server receives the request and sends the requested boot image data blocks to the diskless client in step 860. Through this process, a modified boot image that invalidates cached boot images may be pre-populated in the non-volatile memories of diskless clients in the system. The diskless system may avoid a potential boot storm by updating the cached boot images for the diskless clients at a preferred time when network traffic is low.

Methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media may be handled, read, sensed and/or interpreted by an IHS (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, and/or use of equivalent functional junctions for couplings/links described herein.

What is claimed is:

1. A method of booting a diskless client in an information handling system (IHS) comprising:
    storing a first boot data comprising a first image signature and a first boot image in a non-volatile memory of the diskless client;
    sending a boot request from the diskless client, wherein the boot request comprises an identifier;
    receiving a boot reply based on a second boot data containing a second image signature associated with the identifier, wherein the boot reply is received after validation of the boot request;
    determining a match between the first image signature and the second image signature;
    responding to the match by booting the diskless client utilizing the first boot data;
    receiving a cache update request at the diskless client when network traffic is below a predetermined level following a change of the first boot data to a third boot data; and
    requesting and receiving the third boot data, wherein the diskless client stores the third boot data in the non-volatile memory.

2. The method of claim 1 further comprising:
    validating the boot request by determining if the identifier provides authority to access the second boot data.

3. The method of claim 1, wherein the non-volatile memory is removable from the diskless client.

4. The method of claim 1, wherein the diskless client receives the cache update request only when the change of the first boot data to the third boot data affects a plurality of diskless clients.

5. The method of claim 1, wherein the identifier is user specific or device specific.

6. The method of claim 1, wherein the identifier is selected from the group consisting of a user name, a user number and a media access control (MAC) address.

7. The method of claim 1 further comprising:
    responding to a mismatch between the first image signature and the second image signature by invalidating the first boot data stored by the diskless client;
    requesting and receiving a second boot data comprising the second image signature and a second boot image wherein the diskless client stores the second boot data in the non-volatile memory; and
    booting the diskless client utilizing the second boot data.

8. The method of claim 7, wherein the first boot data and the second boot data each provide information to boot an operating system on the diskless client.

9. A diskless booting system comprising:
    a non-volatile memory, wherein a first boot data comprising a first image signature and a first boot image is stored; and
    a diskless client coupled to the non-volatile memory, wherein the diskless client sends a boot request comprising an identifier and receives a boot reply containing a second image signature after validation of the boot request, the diskless client comprising a processor to determine a match between the first image signature and the second image signature, wherein the diskless client responds to the match by utilizing the first boot data to boot, wherein the diskless client receives a cache update request when network traffic is below a predetermined level following a change of the first boot data to a third boot data comprising a third image signature and a third boot image, and the diskless client request and receives the third boot data, wherein the diskless client stores the third boot data in the non-volatile memory.

10. The system of claim 9, wherein the non-volatile memory is removable from the diskless client.

11. The system of claim 9, wherein the diskless client receives the cache update request only when the change of the first boot data to the third boot data affects a plurality of diskless clients.

12. The system of claim 9, wherein the identifier is user specific or device specific.

13. The system of claim 9, wherein the identifier is selected from the group of consisting of a user name, a user number and a media access control (MAC) address.

14. The system of claim 9, wherein the processor responds to a mismatch between the first image signature and the second image signature by invalidating the first boot data stored by the diskless client, and the diskless client requests and receives the second boot data comprising the second image signature and a second boot image, wherein the diskless client stores the second boot data in the non-volatile memory and the diskless client boots utilizing the second boot data.

15. The system of claim 14, wherein the first boot data and the second boot data each provide information to boot an operating system on the diskless client.

16. A computer-readable medium having computer executable instructions for performing a method comprising:
    storing a first boot data comprising a first image signature and a first boot image in a server;
    storing a second boot data comprising a second image signature and a second boot image in a non-volatile memory of a diskless client;
    sending a boot request from the diskless client, wherein the boot request comprises an identifier;
    sending the boot reply comprising the first image signature from the server to the diskless client after validation of the boot request;
    determining whether there is a match between the first image signature and a second image signature;
    responding to the match by booting the diskless client utilizing the second boot data comprising the second image signature and the second boot image;

responding to a cache update request at the diskless client when network traffic is below a predetermined level following a change of the first boot data to a third boot data by requesting the third boot data; and receiving the third boot data, wherein the diskless client stores the third boot data in the non-volatile memory.

17. The computer readable medium of claim 16 further comprising:

validating the boot request at a server coupled to the diskless client by determining if the identifier provides authority to access the first boot data stored by the server.

18. The computer readable medium of claim 16 further comprising:

responding to a mismatch between the first image signature and the second image signature by invalidating the second boot data stored by the diskless client;

requesting and receiving the first boot data from the server, wherein the diskless client stores the first boot data in the non-volatile memory; and booting the diskless client utilizing the first boot data.

* * * * *